Patented Sept. 6, 1949

2,481,263

UNITED STATES PATENT OFFICE 2,481,263

FERMENTATION PROCESS

Henry M. Tsuchiya and James M. Van Lanen, Peoria, Ill., and Asger F. Langlykke, New Brunswick, N. J., assignors to the United States of America as represented by the Secretary of Agriculture No Drawing. Application January 15, 1948, Serial No. 2,536

15 Claims. (Cl. 195—44)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This invention relates to the production of normal butanol, acetone and ethanol from raw materials comprising crude pentoses as the principal source of carbohydrates. In particular, the invention relates to the fermentation of crude pentosan hydrolysates, such as those obtained by the acid hydrolysis of corncobs, oat hulls, bagasse, flax shives and the like.

The invention has among its objects the fermentation of these aforementioned hydrolysates with microorganisms of the known class of butyl acetonic bacteria in which the hydrolysate constitutes the sole or principal carbohydrate source.

Butanol, acetone, and ethanol are valuable solvents in many commercial processes. They are ordinarily produced by fermentation of amylaceous or sacchariferous materials such as ground corn, rice, wheat, starches, various molasses, corn sugar, and the like.

In the past, mixtures of these solvents have been obtained by the fermentation of refined xylose with various butyl-acetone organisms. The prior processes have been unsatisfactory for commercial purposes, since the costs of solvents recovered were much in excess of those prepared by other methods. For example, the purified sugar used by prior workers is costly in itself and requires the addition of costly nutrients to achieve appreciable yields.

Prior workers have also endeavored to utilize crude xylose in the form of pentose liquors or pentosan hydrolysates, but these prior efforts have many disadvantages, and have met with little practical success. It has been generally found that such crude xylose liquors could not be fermented satisfactorily, especially when employing the liquors as the principal source of carbohydrates. In U. S. Patent 1,913,164, Legg and Christensen describe the inherent difficulties which attend the use of xylose especially in its crude forms. The fermentation is subject to adverse effects of contaminating organisms, and the xylose containing liquors are very difficult to sterilize due to the ease with which xylose caramelizes. The crude liquors contain a plurality of factors toxic to the fermentation organisms. These factors cannot be removed by prior known methods without necessitating the subsequent addition of large amounts of expensive nutrients.

Prior workers were forced to supplement the liquors with large proportions of other carbohydrates such as corn meal. Although these methods made possible the utilization of crude xylose or pentose liquors, nevertheless they resulted in additional costs and a more complicated procedure.

In the course of our researches we have found that it is possible to ferment the raw crude pentose liquors with the addition of non-carbohydrate nutrients only, but the variety and amount of nutrients necessary for satisfactory results raise the cost of the desired solvents unduly. One of the reasons for this is the fact that other materials which are present in the crude materials have an adverse effect on the growth of the organism, and this effect must be countered by the addition of larger amounts of a variety of expensive nutrient materials.

According to this invention, it has been discovered that crude pentose liquors such as the xylose-containing liquors obtainable by the acid hydrolysis of pentosan-containing materials may be utilized without carbohydrate supplements, and which require relatively few additional nutrient factors to produce high yields of the desired solvents. It is to be understood, nevertheless, that in accordance with our invention the pentose liquors may be supplemented by the addition of other carbohydrate materials if desired, such as corn meal, molasses, and the like, but such supplementation is merely optional and wholly unnecessary.

In general, our process is characterized by treatment of the pentose liquors to remove deleterious factors, special sterilization procedure, and the addition of inexpensive nutrients to supply a suitable nitrogen source and a suitable phosphate source.

In our process organisms of the known class of butylacetonic bacteria are employed for the fermentation, preferably. We have obtained particularly advantageous results with Clostridium A-14 (NRRL-B-594).

Heretofore, it has been impractical, or in most cases, impossible to utilize pentosan hydrolysates as the sole carbohydrate source in this type of fermentation, for several reasons. As previously stated the hydrolysates are usually produced in commerce by the acid hydrolysis of pentosan-containing materials such as corncobs, oat hulls, bagasse, flax shives, and the like. They are in substance crude solutions of pentoses, such as xylose, which also contain a variety of other organic and inorganic substances, several of which are toxic to the fermentation. They are also usually characterized by the presence of other microorganisms which adversely affect the action of the solvent-producing organisms. These contaminants, if not present in the hydrolysate as initially produced, find their way into the solution during the subsequent neutralization or other unavoidable handling steps. This is particularly true of the contaminating microorganisms.

In addition to the above difficulties, the crude hydrolysate liquors do not contain sufficient and suitable nutrients to support satisfactory growth of the fermenting organisms. Furthermore, as previously stated, xylose is very easily caramelized and, as a consequence, the solutions are difficult to sterilize to eliminate the adverse effects of contaminating microorganisms.

In view of the difficulties discussed in the foregoing paragraphs, there has been a general belief that these crude pentose-containing liquors were not fermentable in practical concentrations without the addition of large amounts of other carbohydrates. These amounts vary from a minimum of 50 percent to 99 percent corn meal or the like in the case of corncob hydrolysates. Legg and Christensen describe such a process in the patent previously noted. According to Underkofler and coworkers in Ind. and Eng. Chem. vol. 29, pages 1290-1292, oat hull hydrolysates require 50 percent or more replacement by additional carbohydrates. In every case the prior fermentations required substantial amounts of more or less expensive carbohydrate supplements.

In accordance with our invention the hydrolysate liquor is treated to remove the toxic materials, whereby the treated liquors may be utilized as the sole carbohydrate source in the fermentation. The preferred process comprises subjecting the hydrolysates to the action of finely divided iron. Although preferably carried out before the actual fermentation, this may also be done during the actual fermentation. It is preferable for practical reasons that it be done as a pretreatment.

The hydrolysate is subjected to the action of finely divided iron such as iron filings, "burner dust," and the like, at a preferred pH of 6 to 10 in the pretreatment. The iron is added in amounts ranging from 0.1 to 1.0 gram per 100 ml. of hydrolysate and the mixture subsequently agitated for several hours. The hydrolysate may also be passed slowly through a column packed with the iron particles.

Where treated during fermentation, the pH range is of course the same range as the fermentation, that is, about pH 5 to about pH 7. The iron is added directly to the mash along with the nutrients. During fermentation the action of the organism results in a certain amount of circulating currents in the mash which accomplishes sufficient contact with the iron to produce satisfactory results.

Another aspect of our invention comprises subjecting the raw crude hydrolysates to a neutralization treatment or pH adjustment. The hydrolysate may be taken directly from the hydrolyzer while at a temperature of 200° F. to boiling (about 215° F.), and neutralized while hot. Lime is preferred as the neutralizing agent, others may be used. This may be done by running the hydrolysate directly into a neutralization tank and adding lime to adjust the hydrogen ion concentration to between pH 5 to pH 10. The final acidity depends on the temperature of neutralization. If carried out at temperatures above 150° F. the acidity is preferably adjusted to pH 5 to pH 7, the higher temperature corresponding to the lower value for pH. If the neutralization is carried out at temperatures below 150° F. more lime must be added, and the alkalinity raised to the higher values. Room temperatures require about pH 8 to pH 10.

These treatments of the hydrolysate liquors accomplish the removal of toxic materials. Copper, introduced into the liquors by use of copper alloy equipment, is removed from the solution as well as other toxic materials of undetermined character.

The removal of these latter toxic materials we have discovered to be at least as important as the removal of copper. In the lower temperature ranges in the case of the adjustment of pH, without addition of iron, copper is not so efficiently removed, but the other deleterious materials are. A combination of the two processes gives excellent results. For example, the hydrolysate is treated while hot with lime to adjust the hydrogen ion concentration to about pH 6 to pH 7 and subsequently treated with iron while hot.

Another important feature of our invention is in the sterilization of the hydrolysate liquors. In view of the practical difficulties of maintaining sterile or aseptic conditions in the handling of materials and equipment it is necessary to provide a means for sterilizing the media prior to inoculation. We have discovered that in spite of the known tendency for xylose to be decomposed at elevated temperatures, the hydrolysate solutions may be sterilized at temperatures sufficiently high to eliminate the adverse effects of any contaminating microorganism by a quick or "flash" sterilization.

According to the usual methods, treatment of the hydrolysates at elevated temperatures results in the caramelization of the xylose. This destruction of xylose is also accompanied by the formation of certain toxic materials. We subject the solution to our quick sterilization, and the liquors are satisfactorily sterilized, but at the same time the xylose is not appreciably decomposed.

We prefer to accomplish the sterilization by heating the solution rapidly to temperatures within the range of 270° to 280° F. for 2 min. to 6 min. and subsequently cooling rapidly. One practical way in which the sterilization may be accomplished is by continuously passing the liquors through a steam injection apparatus in which they are rapidly heated, held at the desired temperature for the proper length of time and subsequently rapidly cooled. Other means of quickly raising the temperature may of course, be employed, such as indirect heat exchange devices, and the like.

It is desirable to maintain a low oxidation-reduction potential in fermentations of this type utilizing anaerobic organisms. For example, finely divided iron may be added to the mash, or as is true in the case of the usual production equipment, the shape of the fermenters serves to control the potential within the necessary limits. In the case of treatment with finely divided iron, in which the treatment is carried out during the actual fermentation, the presence of the iron particles would serve the double purpose of removal of toxic factors and maintenance of the necessary low potential.

Another feature of our invention relates to the nutrient media. Due to our removal of toxic factors without removing or destroying the beneficial nutrients present, the addition of cheap and readily available substances to the treated hydrolysates will effect satisfactory production of the desired solvents. As a result the production costs of the solvents are reduced to a surprisingly low figure.

Raw, crude pentosan hydrolysates contain in addition to the reducing sugars, other critically important ingredients. We have discovered the inherent presence of certain substances beneficial to the fermentation in the crude hydrolysates along with the deleterious factors known to be present. These are substances essential for the growth of the fermentation organism, and in the absence of the toxic materials, can serve to a great extent to take the place of the expensive added nutrients. However, due to the presence of the other deleterious factors in the solution, these beneficial substances could not heretofore be utilized in the fermentation process.

If the crude, raw hydrolysate is purified sufficiently to remove the contaminating toxic materials according to usual procedures, the addition of expensive nutrients is required for satisfactory fermentation. This is due to the fact that the substances essential for the growth of the organism are either removed or destroyed by such purification procedures.

Although the deleterious effect of the copper and other toxic materials can be overcome by the addition of expensive non-carbohydrate nutrients or the addition of proportionately large amounts of starchy materials, or both, as previously described, such procedure is economically prohibitive for commercial production of the desired solvents.

Our treatment steps remove copper and also these other toxic materials. At the same time, these treatments do not materially affect the substances essential for the growth of the organisms. As a result, fermentation will occur satisfactorily if relatively small amounts of inexpensive nutrients supplying suitable nitrogen and phosphate sources are added. We prefer to add the nitrogen in the form of ammonium sulfate in the range of 0.1 to 0.3 gram of the salt per 100 ml. of mash. Other ammonium salts may be used, in the same nitrogen ratio. The phosphate source is preferably in the form of triple superphosphate in the range of 0.01 to 0.15 gram of the salt per 100 ml. of solution. Other nutrients may be added if desired, but are not necessary. Other suitable nitrogen sources are ammonium chloride, ammonium carbonate, urea, $NH_3$ or $NH_4OH$ and the like. Other suitable phosphate sources are the calcium phosphates, sodium or potassium phosphate, ammonium phosphate, or the like.

The crude xylose-containing solution employed in the following specific examples was a pentosan hydrolysate produced by the acid saccharification of corncobs. We prefer to use a hydrolysate such as Ind. and Eng. Chemistry, described by J. W. Dunning and E. C. Lathrop in vol. 37, pages 24–29. The liquor as it comes from the hydrolyzer contains about 15 percent (or slightly over) sugars, mainly xylose, 4 to 5 percent sulfuric acid and about 2 percent acetic acid. It may be treated in a plurality of alternative manners.

(1) The hydrogen ion concentration may be adjusted while hot to a pH of 5 to 10, filtered, allowed to cool, and the pH adjusted to 6.5, whereupon the liquor is again filtered.

(2) It may be taken from the hydrolyzer, preliminarily limed, allowed to cool and subsequently heated to room temperature or above and the hydrogen ion concentration adjusted to pH 5 to pH 10, filtered, cooled and filtered again.

(3) It may be taken from the hydrolyzer, and after preliminary liming and cooling, the pH adjusted to about 6 or greater, iron added and the mixture agitated, and the solution finally cooled and filtered. The contacting with iron may be accomplished by flowing the solution through a tube or tower containing the iron, such as, for example, by gravity flow through a tower packed with the finely divided iron particles.

(4) The hydrolysate may be limed to pH 6 to 6.5, filtered, diluted to give the proper sugar concentration for fermentation. In this case the iron treatment is carried out during the fermentation.

The treated liquors in each of the above alternative procedures are then ready after the addition of nutrients for fermentation purposes. In the cases where the hydrolysate is subjected to the action of finely divided iron the treatment is carried out for a substantial period of time. The time may vary over a wide range.

We have found that the addition of certain finely divided inert solids to the fermentation mash or to the inoculum mash have a beneficial effect upon the total conversion of the sugar. These fines present surfaces upon which the organism may grow and, in each case, give a more rapid and somewhat increased yield of the desired solvents. The amount of fines added may vary from 0.1 to 1.0 percent by weight of the mash.

In the following examples the results of fermentation have been evaluated on the basis of sugar consumption. It has been our experience that in this particular fermentation the consumption of sugar is a reliable and convenient criterion for conversion to the desired solvents. This is illustrated by the following. A mash of the following composition was fermented on two separate occasions.

Table I

|  | Grams per 100 ml. |
| --- | --- |
| Pentosan hydrolysate to yield reducing sugar value of | 4.7 and 4.8 |
| $(NH_4)_2SO_4$ | 0.3 |
| $(NH_4)_2HPO_4$ | 0.07 |
| Corn steep liquor (wet basis) | 0.4 |
| $CaCO_3$ | 0.5 |
| Burner dust (Reduced Fe) | 0.2 |

To illustrate the correlation between the percent fermentation and the yield of the desired solvents the results of both fermentations are tabulated as follows:

Table II

| Ferm. | Per cent initial sugar | Per cent residual sugar | Per cent fermentation | Neutral solvents | | |
| --- | --- | --- | --- | --- | --- | --- |
|  |  |  |  | gms. butanol per 100 ml. | gms. acetone per 100 ml. | gms. ethanol per 100 ml. |
| 1 | 4.7 | 0.8 | 83.0 | 0.63 | 0.31 | 0.05 |
| 2 | 4.8 | 0.6 | 87.5 | 0.95 | 0.40 | 0.15 |

The following example illustrates our treatment of the crude xylose-containing solutions to remove the toxic factors and the comparative effect of this treatment on the fermentability of the liquors.

EXAMPLE 1

A pentosan hydrolysate was taken directly from the hydrolyzer at a temperature of about 210° F. The copper content was about 60 parts per million. The liquid was run into a wooden tank and lime added to adjust the acidity to pH 6. To the hot liquid was added 0.2 g. of finely divided iron per 100 ml. of hydrolysate. The liquor was then filtered, nutrients added, sterilized, and fermented.

The following mash composition was used.

Table III

| | Grams per 100 ml. |
|---|---|
| Pentosan hydrolysate to yield reducing sugar value of | 5.2 |
| $(NH_4)_2SO_4$ | 0.2 |
| Triple superphosphate | 0.05 |

After fermentation of 120 hours there was a sugar conversion of 80.8.

In contrast to the above example, a hydrolysate which was not adjusted while hot (and consequently contained the deleterious materials) was limed to give a pH of 6.25 and otherwise treated identically failed to produce significant fermentation in the same period.

EXAMPLE 2

A pentosan hydrolysate was limed to pH 6.25 and filtered. It was diluted to give a solution containing a reducing sugar value of 5.1 percent. Nutrients were then added, the solution sterilized and inoculated with Clostridium A-14.

For comparison another hydrolysate was taken from the hydrolyzer, limed, filtered, and diluted as above. In this instance, finely divided iron in the form of "burner dust" was added with the nutrients and the solution subsequently sterilized and inoculated with the same organism. The composition of the two mashes are tabulated below.

Table IV

| Composition | Mash A Grams per 100 ml. sol. | Mash B Grams per 100 ml. sol. |
|---|---|---|
| Pentosan hydrolysate to give reducing sugar value of | 5.1 | 5.1 |
| $(NH_4)_2SO_4$ | 0.3 | 0.3 |
| $(NH_4)_2HPO_4$ | 0.07 | 0.07 |
| Corn steep liquor (wet basis) | 0.4 | 0.4 |
| $CaCO_3$ | 0.5 | 0.5 |
| Burner dust | | 0.2 |

After 120 hours, the following results were obtained:

Table V

| | Grams per 100 ml. sol. initial sugar | Grams per 100 ml. sol. residual sugar | Percent fermentation |
|---|---|---|---|
| Mash A | 5.1 | 5.0 | 0 |
| Mash B | 5.1 | 0.75 | 85.3 |

As previously described the treatment with iron may be carried out before sterilization of the hydrolysate or it may be carried out during the actual fermentation process. In the former case, after the iron treatment and subsequent filtration step, the pH of the liquid must be adjusted before fermentation, since it drops during the sterilization. The following example illustrates such procedure.

EXAMPLE 3

A pentose hydrolysate was limed to pH 9, filtered, and 0.5 gram per 100 ml. of finely divided iron in the form of burner dust was added and the mixture agitated. The agitation was continued for several hours after which time the mixture was filtered. The solution was diluted to 5 percent reducing sugar (principally as xylose) and 0.2 percent ammonium sulphate was added together with 0.05 percent $Ca(H_2PO_4)_2.H_2O$. The mash was sterilized, the pH was adjusted to 6.25 and the mash was inoculated with Clostridium A-14. After 120 hours the solution had a residual content of 0.87 percent sugar, corresponding to an 82.5 percent fermentation conversion.

The following example, similar to the iron treated fermentation in Example 2, illustrates the iron treatment during fermentation.

EXAMPLE 4

A pentosan hydrolysate after having been limed and diluted to give a reducing sugar value of 5.3 percent was used to make up the following mash composition:

Table VI

| | Grams per 100 ml. sol. |
|---|---|
| Pentosan hydrolysate to give reducing sugar value of | 5.3 |
| $(NH_4)_2SO_4$ | 0.3 |
| $(NH_4)_2HPO_4$ | 0.07 |
| Corn steep liquor (wet basis) | 0.4 |
| $CaCO_3$ | 0.5 |
| Reduced Fe | 0.2 |

After 120 hours the solution had a residual content of 0.68 percent sugar corresponding to an 87.0 percent fermentation conversion. Comparison of these results with those of Mash A of Example 2 illustrates the advantageous effect of the presence of the iron.

Our sterilization procedure may be illustrated by the following tabulated data. In Table VIII the temperature was varied and the time of retention was kept constant at 3 minutes in a series of experiments. In Table IX the temperature was kept constant at 275° F. and the retention time was varied from 2 to 6 minutes. The percent conversion in the second table is slightly lower than desired, but the values illustrate the effect of the retention time. It was subsequently found that in the second set of experiments the inoculum was substandard in activity.

In these experiments the composition of the mash was as follows:

Table VII

| | Grams per 100 ml. sol |
|---|---|
| Pentosan hydrolysate to give reducing sugar value of | 4.33–4.64 |
| $(NH_4)_2SO_4$ | 0.3 |
| $(NH_4)_2HPO_4$ | 0.07 |
| Corn steep liquor (wet basis) | 0.4 |
| $CaCO_3$ | 0.5 |
| Burner dust | 0.2 |

Table VIII

| Temperature (F.) | Grams per 100 ml. sol. initial sugar | Grams per 100 ml. sol. residual sugar | Percent fermentation |
|---|---|---|---|
| 260 | 4.60 | 0.52 | 88.6 |
| 275 | 4.64 | 0.55 | 88.1 |
| 290 | 4.57 | 0.52 | 88.6 |
| 305 | 4.33 | 0.57 | 86.9 |

Table IX

| Retention time (Min.) | Grams per 100 ml. sol. initial sugar | Grams per 100 ml. sol. residual sugar | Percent fermentation |
|---|---|---|---|
| 2 | 5.13 | 1.22 | 76.2 |
| 3 | 5.13 | 1.16 | 77.3 |
| 4 | 5.08 | 1.00 | 80.4 |
| 5 | 5.05 | 1.08 | 78.7 |
| 6 | 5.04 | 1.07 | 81.5 |

In the foregoing examples, it will be noted that for the most part the mash compositions have been made up to correspond closely with each other regarding most of the constituents. This has been done for purposes of comparison. The mashes contain the usual nutrient ingredients for this type of fermentation. As previously pointed out, our methods of removal of the various toxic materials make possible the elimination of several of the more costly ingredients, and the fermentation, according to the invention, may be advantageously conducted with only the nitrogen source and the phosphate source. This is illustrated in Example 3.

For example, the tabulated mash of Table I, mash A of Example 2, the tabulated mash of Example 4, as well as the mashes of Table VII, while giving excellent results can be substituted by mashes containing as added nutrient only a suitable nitrogen source and a suitable phosphate source.

Preferably the range of sugar content may vary within the range of 4.5 to 6.0 grams per 100 ml.

Although higher or lower concentrations will give satisfactory results, the concentration of assimilable nitrogen may vary within the range of 0.1 to 0.3 gram per 100 ml. calculated as weight of ammonium sulfate, and the concentration of assimilable phosphate may vary within the range of 0.01 to 0.15 gram per 100 ml. calculated as triple superphosphate.

As previously discussed we have furthermore found that the addition of inert material in the form of fines mechanically assists in the growth of the fermentation organism. This material may be ground corncobs, screening fines from cob crushing, ground oat hulls, chaff, bran and similar material. The choice of material is dictated by its relative cheapness and inertness to the fermentation. The following example illustrates the procedure.

EXAMPLE 5

A series of experiments was conducted with mashes of the following compositions. In all cases the pentosan hydrolysate had been given a pretreatment with burner dust as described in Example 3.

Table X

| Composition of mash | Grams per 100 ml. sol |
|---|---|
| Pentosan hydrolysate to give reducing sugar value of.. | 4.87 |
| $(NH_4)_2SO_4$ | 0.2 |
| $Ca(H_2PO_4)_2 \cdot H_2O$ | 0.05 |

To each of a series of this media was added varying amounts of corncob screenings as fines. The results are tabulated below.

Table XI

| Grams per 100 ml. fines | Grams per 100 ml. sol. initial sugar | Grams per 100 ml. sol. residual sugar | Per cent fermentation |
|---|---|---|---|
| 0 | 4.87 | 0.96 | 79.8 |
| 0.1 | 4.87 | 0.96 | 80.4 |
| 0.2 | 4.87 | 0.81 | 83.3 |
| 0.5 | 4.87 | 0.83 | 83.0 |
| 1.0 | 4.87 | 0.82 | 83.2 |

The process of this invention is not to be limited to the procedures specified in the foregoing examples, but may be varied in many different ways, as will be obvious to those skilled in the art. For example, the time of fermentation may vary over the usual range of 40 hours or more. The carbohydrate source of crude pentose-containing liquors may be supplemented by other carbohydrate sources. The spray dried solids from the pentosan hydrolysates may be used to make up the raw crude liquors. The procedure known as "back-slopping" may be followed to economize on residual nutrients and water. Other nutrients may be added to the media, as desired.

Having thus described our invention, we claim:

1. A process for the production of normal butanol, acetone and ethanol by fermenting a mash containing crude pentose sugars and copper by adding iron comprising removing copper, adding nutrients comprising an assimilable nitrogen source and an assimilable phosphate source, sterilizing the mash and subsequently fermenting the mash with butyl-acetonic bacteria, substantially the sole carbohydrate source being the crude pentose sugars.

2. A process for the production of normal butanol, acetone and ethanol by fermenting a mash containing crude pentose sugars comprising neutralizing crude pentosan hydrolysate to a pH of 5 to 10 at temperatures between room temperature and 215° F., removing insoluble material, adding finely divided iron, adding nutrients comprising an assimilable nitrogen source and an assimilable phosphate source, adjusting the pH to 6.0 to 6.5, sterilizing the mash and subsequently fermenting the mash with butyl-acetonic bacteria.

3. A process for the production of normal butanol, acetone and ethanol by fermenting a mash containing crude pentose sugars comprising treating crude pentosan hydrolysate to a pH no lower than 6.0 with finely divided iron, adding nutrients comprising an assimilable nitrogen source and an assimilable phosphate source, sterilizing the mash and subsequently fermenting the mash with butyl-acetonic bacteria.

4. In a process for the production of normal butanol, acetone and ethanol by fermenting a mash containing pentosan hydrolysate with an organism of the class of butyl-acetonic bacteria, the step which comprises contacting the pentosan hydrolysate with finely divided iron.

5. Process of claim 4 in which from 0.1 to 1.0 gram of finely divided iron per 100 ml. of hydrolysate liquor is added to the raw pentosan hydrolysate, removing the iron from the treated hydrolysate liquor, and sterilizing by heating rapidly to a sterilization temperature within the range of 270 to 280° F., adjusting the pH to a range of 6 to 7, holding said temperature within said range for a period of 2 to 6 minutes and then immediately and rapidly cooling.

6. Process of claim 4 in which the hydrolysate liquor is sterilized by heating rapidly to a sterilization temperature within the range of 270° to 280° F., maintaining said temperature within said range for a period of 2 to 6 minutes, rapidly and immediately cooling said hydrolysate and adding from 0.1 to 1.0 gram of finely divided iron per 100 ml. of hydrolysate liquor along with the nutrients.

7. In a process for the production of normal butanol, acetone and ethanol by fermenting a mash containing pentosan bacteria, the steps comprising adjusting the acidity of the raw crude hydrolysate to pH 5 to 10, with lime at about 150 F. to 215° F., removing the insoluble material, and treating the hydrolyzate with finely divided iron.

8. A process for the production of normal butanol, acetone and ethanol by fermenting a mash containing crude pentose sugars as the principal carbohydrate source comprising treating crude pentosan hydrolysate at a pH no lower than 6.0 with finely divided iron, filtering, adjusting the hydrogen ion concentration of the sterilized solution to pH 6.0 to 7.0, adding nutrients comprising an assimilable nitrogen source and an assimilable phosphate source, sterilizing the mash and subsequently fermenting with an organism of the class of butyl-acetonic bacteria.

9. Process according to claim 1 in which the pentosan hydrolysate is the sole carbohydrate source.

10. A process for the production of normal butanol, acetone and ethanol by fermenting a mash containing pentose sugars which comprises treating crude pentosan hydrolysate at a pH no lower than 6.0 with finely divided iron, adding nutrients comprising an assimilable nitrogen source and an assimilable phosphate source, sterilizing the mash by rapidly heating to a sterilization temperature within the range of 270° to 280° F., holding at said temperature for a period of 2 to 6 minutes and immediately rapidly cooling, adjusting the acidity of the sterilized solution to pH 6 to 7.0, and inoculating the resulting mash with an organism of the class of butyl-acetonic bacteria and subsequently fermenting the mash.

11. Process of claim 10 in which inert fines are present during the fermentation.

12. Process of claim 10 in which inert fines are incorporated in the inoculum mash.

13. In a process for making normal butanol, acetone, and ethanol, by fermenting a pentosan hydrolysate produced by acid saccharification and containing sulfuric acid, the improvements comprising adding an alkaline reagent to adjust the hydrolysate to a pH of about 5 to 10, removing insoluble material, treating the hydrolysate with reduced iron, and subjecting the treated hydrolysate to butanol producing bacterial fermentation in the presence of assimilable nitrogen and phosphate nutrients, the sole carbohydrate source being the pentosan hydrolysate.

14. The process of claim 13 in which the pH is adjusted to no lower than 6 in the treatment with iron.

15. The process of claim 13 in which the alkaline reagent is lime and the temperature of the lime-adjusted hydrolysate is above 150° F.

HENRY M. TSUCHIYA.
JAMES M. VAN LANEN.
ASGER F. LANGLYKKE.

REFERENCES CITED

The following references are of record in the file of this patent:

UNITED STATES PATENTS

| Number | Name | Date |
| --- | --- | --- |
| 1,913,164 | Legg et al. | June 6, 1933 |
| 2,326,425 | Arzberger | Aug. 10, 1943 |
| 2,368,074 | Walton | Jan. 23, 1945 |